United States Patent
Razin

(10) Patent No.: US 6,629,760 B1
(45) Date of Patent: Oct. 7, 2003

(54) ADJUSTABLE EYEGLASSES RETAINER

(75) Inventor: Mark S. Razin, Laguna Beach, CA (US)

(73) Assignee: Silverfish, LLC, Laguna Beach, CA (US)

( * ) Notice: Subject to any disclaimer, the term of this patent is extended or adjusted under 35 U.S.C. 154(b) by 0 days.

(21) Appl. No.: 09/647,252

(22) PCT Filed: Mar. 24, 1999

(86) PCT No.: PCT/US99/06894

§ 371 (c)(1),
(2), (4) Date: Sep. 22, 2000

(87) PCT Pub. No.: WO99/49351

PCT Pub. Date: Sep. 30, 1999

(51) Int. Cl.[7] .................................................. G02C 3/00
(52) U.S. Cl. ....................................................... 351/156
(58) Field of Search ........................... 351/41, 116, 123, 351/156–158; 600/15

(56) References Cited

U.S. PATENT DOCUMENTS

| | | |
|---|---|---|
| 2,023,523 A | 12/1935 | Grimball |
| 2,819,650 A | 1/1958 | Seron |
| 2,914,769 A | 12/1959 | Anderson |
| 3,582,194 A | 6/1971 | Liautaud |
| 3,728,012 A | 4/1973 | Downey |
| 4,264,987 A | 5/1981 | Runckel |
| 4,317,240 A | 3/1982 | Angerman |
| 4,549,793 A | 10/1985 | Yoon |
| 4,657,364 A | 4/1987 | Murrell |
| 4,761,068 A | 8/1988 | Star |
| 4,953,967 A | 9/1990 | Somerville |
| 4,978,210 A | 12/1990 | Lundbeck |
| 4,986,650 A | 1/1991 | Wilhelmi |
| 5,249,001 A | 9/1993 | Jannard |
| 5,386,254 A | 1/1995 | Kahaney |
| 5,406,340 A * | 4/1995 | Hoff ............................ 351/156 |
| 5,488,441 A | 1/1996 | Pomatti |
| 5,511,251 A * | 4/1996 | Brakas ........................ 351/116 |
| 5,541,676 A | 7/1996 | Pallat |
| 5,583,583 A | 12/1996 | Wilson |

(List continued on next page.)

FOREIGN PATENT DOCUMENTS

| | | |
|---|---|---|
| FR | 2631464 | 5/1988 |
| GB | 1184202 | 3/1967 |
| WO | WO87/01820 | 3/1987 |
| WO | WO 90/09609 | 8/1990 |
| WO | WO 96/24315 | 8/1996 |
| WO | WO 97/33190 | 9/1997 |

OTHER PUBLICATIONS

Copy of magazine ad in Surfer Magazine's Nov. 2000 issue of Oakley's "Water Jacket Eyewear" with Copyright date year 2000.

Printout of browser page at http://www.oakley.com/cda/3.0/0, 1676,49–MA–1–9–3372,00.html dated Nov. 6, 2000 regarding Oakley's "Water Jacket Eyewear".

Copy of ad in Surfer Magazine of Oakley's eyewear around the date of Oct. 28, 1999.

*Primary Examiner*—George Manuel

(57) ABSTRACT

The present invention is an eyeglass frame arrangement fabricated of a combination of a generally rigid, strong, non-elastic lens support, nose bridge, eye socket engager and temple bows. The arrangement is also equipped with a generally non-elastic restraining strap removably engaged around the back of the head. The arrangement is adapted for use while engaging in activities which involve the possibility of physical forces, and/or usages around bodies of water. The arrangement, when secured, applies only an insignificant amount of pressure to the user's head. The arrangement is such that water easily drains out of the bottom of the arrangement.

16 Claims, 2 Drawing Sheets

U.S. PATENT DOCUMENTS

| | | |
|---|---|---|
| 5,628,092 A | 5/1997 | Harris et al. |
| 5,664,291 A * | 9/1997 | Stoller .......................... 24/3.3 |
| 5,711,035 A | 1/1998 | Haslbeck |
| 5,781,273 A | 7/1998 | Boden |
| 5,786,882 A | 7/1998 | Satterthwaite |
| 6,047,410 A * | 4/2000 | Dondero ..................... 351/158 |
| 6,053,859 A * | 4/2000 | Haglung ...................... 600/15 |
| 6,065,833 A | 5/2000 | Tiano |
| 6,092,897 A | 8/2000 | Smerdon, Jr. |

* cited by examiner

ADJUSTABLE EYEGLASSES RETAINER

This application is based on Provisional U.S. Application No. 60/079,224 filed Mar. 24, 1998.

The present invention relates to devices for holding eyeglasses, sunglasses, and the like securely in place on a wearer's head, during athletic sports such as surfing, body surfing, windsurfing, water polo, kayaking, basketball, skiing, jet skiing, snowboarding, biking, mountain biking, racquetball, skydiving, paragliding, surfing, tennis, hiking, jogging, and other activities where abrupt turbulence might be encountered by water, human contact, wind, etc.

BACKGROUND OF THE INVENTION

In certain sports and athletic activities, the athlete is potentially or actually exposed to various abrupt or high turbulence situations. By way of example and not by way of limitation, surfing and related activities expose people to substantial wind and wave "gusts", much or all of which is an unavoidable and even desirable and enjoyable part of the sport or activity. For persons who wear eyeglasses or who want or need to wear sunglasses, that abrupt, high turbulence can impede or even prevent their effective participation in the sport. Although a number of attempts have been made to enable eyeglasses or sunglasses to be worn during such activities, to date they have been unsatisfactory solutions.

All prior eyewear (of which the inventor is aware) that have been made specifically for use in such water sports or similar "high-turbulence" activities have used elastic and/or cushioning materials.

Certain prior solutions have attempted to keep eyewear on the face of the wearer by using goggles which, by their definition, fit snugly against the face. In order to fit snugly against the face and to adapt to the various features of each user's face, goggles consist of either an elastic part, usually the strap, or a foam padding or a combination of the two. However, with multi-directional turbulence or severe turbulence, the goggles (even those with two eyepieces, such as illustrated in U.S. Pat. No. 4,264,987 to Runckel) easily slide off the face of the wearer due to the extra "play" that elasticity and/or foam padding contain.

Additionally, the way a snug fit is achieved is by putting pressure against the face, which, when tightened sufficiently to be useful, is uncomfortable.

Also, in using elastic straps, current solutions forego the quick and easy adjustability of a hook-and-pile fastening material of a type such as that marketed under the registered trademark Velcro®.

Other goggle solutions, in an attempt to reduce fogging, contain holes in the frame in order to provide air flow. However, these arrangements, generally used in snow skiing or for shop work, do not make use of the nose bridge or eye socket areas as points of restriction and, therefore, the goggles easily come off under turbulent conditions, which is not what they were designed for to begin with.

Also, goggles generally do not have temple bows. And, solutions that lack temple bows increase the flexibility and elasticity around the circumference of the wearer's head which, in turn, increases "play" and thereby decreases security.

Additionally, solutions where temple bows are not utilized lack the stability that the temple bows provide, allowing twisting and turning which can be a danger to the wearer's eyes.

Also, goggle solutions typically are worn close to the face and do not allow any air flow (except for the aforementioned versions with air holes that make the goggles even more flexible and easy to dislodge), which increases fogging.

Also, under a lesser degree of water turbulence, even if the large "comfortable" goggles mentioned above were able to more reliably stay on the face, water would seep in and fill up the eyepieces because a seal is too difficult to maintain, especially when a force acts upon the eyewear in the wrong direction (even if it is only a mild force). This water would in turn obstruct the vision or cause other problems.

Other solutions such as Thomas W. Pomatti's, U.S. Pat. No. 5,488,441 issued Jan. 30, 1996, consist of flexible materials in the frame. However, this solution requires a "sufficient force" strong enough to "deform the . . . frame" to conform to the user's head. And again, this pressure on the wearer's head is a source of discomfort to the user's head and eye sockets.

Others, such as international application Edmond E. Murrell's, PCT/US86/01832, attach to the bows and secure the glasses to the user with a head band. However, this and similar solutions, do not keep the glasses on the head of the wearer under turbulent conditions because of either: (1) the elastic strap and the "play" it allows; (2) the non-locking fastenings that attach to the bows are not particularly secure because they are not locked into place; or (3) the non-locking adjustability mechanism, usually adjusted at the back of the head, is not particularly secure either.

Also, devices such as Murrell's are generally not easily detached from the frames or adjusted on the wearer's head. And, as is apparent with all of these shortcomings, they were never designed to be used in activities where abrupt turbulence is usually encountered.

In fact, the inventor is not aware of any existing contraption that keeps eyewear on the wearer's head during "high-turbulence" situations such as those described above. Prior solutions have typically concentrated on leash devices or floating apparatus, on the assumption that the eyewear will fall off the face of the user under such conditions.

Additionally, eyeglasses (especially metallic frames) can be exposed to rust and other damage from the relatively harsh environments described above, or even from the user's sweat.

OBJECTS AND ADVANTAGES OF THE INVENTION

Accordingly, it is an object of the present invention to provide a means for keeping eyewear on the head of the wearer during athletic sports such as surfing, body surfing, windsurfing, water polo and other activities where abrupt turbulence might be encountered by water, human contact, wind, etc.

It is another object to prevent water from becoming trapped between the wearer's face and the eyewear.

It is another object to avoid an elastic pressure (specifically, an uncomfortable pressure) on the head of the user.

It is another object to allow easy adjustability to fit all head sizes.

It is another object to allow the user to convert the arrangement to and from a secured format, easily.

It is another object to prevent the device from twisting and turning on the user's face.

It is another object to reduce or eliminate fogging of the lenses during use.

A still further object is to provide metallic frames for eyeglasses that are less susceptible to damage from rust and the like, from the relatively harsh environments described above, or even from the user's sweat.

Other objects and advantages of the invention will be apparent from the following specification and the accompanying drawings, which are for the purpose of illustration only.

LIST OF REFERENCE NUMERALS

| No. | Description |
| --- | --- |
| 11 | Eyeglass frame arrangement (shown without restraining strap) |
| 12 | Eye socket engager (in contrast to standard nose pads - positioning) |
| 13 | Temple bow |
| 14 | Retaining Strap |
| 15 | Locking loop portion (of retaining strap) |
| 16 | Pile portion of hook-and-loop fastening material (portion of retaining strap) |
| 17 | Hook portion of hook-and-loop fastening material (portion of retaining strap) |
| 18 | Slit in rear end of temple bow |
| 20 | Nose bridge |
| 23 | Lens |
| 24 | Lens Support |
| 25 | Channel |
| 26 | Retaining strap |
| 27 | Locking ring |
| 28 | Stitching |
| 30 | Holes |
| 40 | Eyeglass frame arrangement (2nd embodiment, also shown without restraining strap) |

DESCRIPTION OF PREFERRED EMBODIMENT

Figure 1:
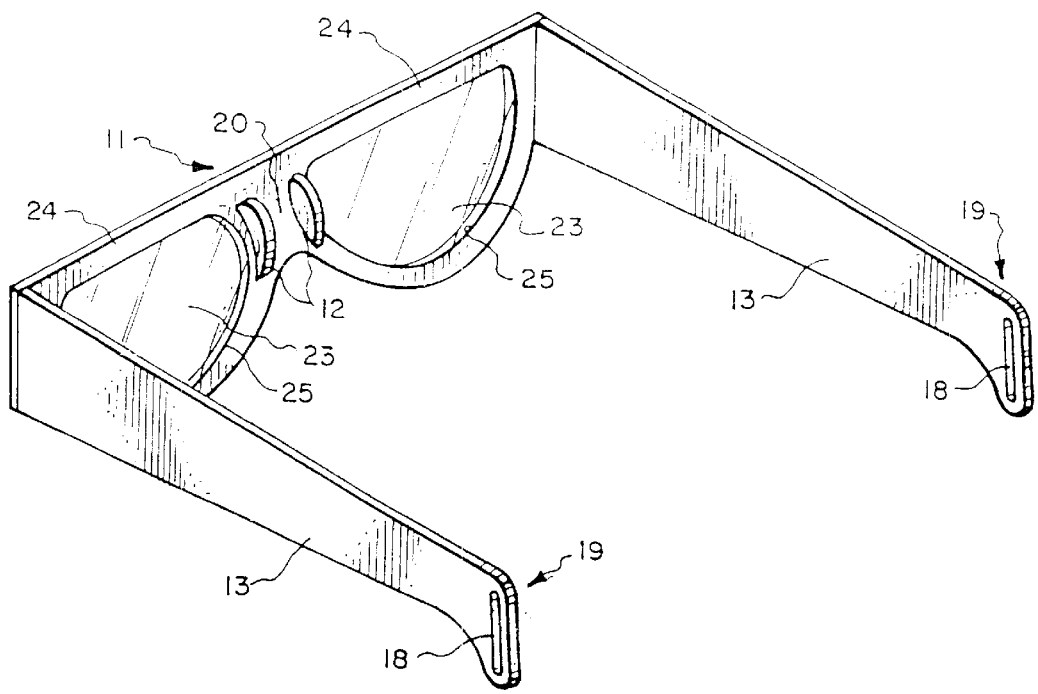
FIG. 1 is a perspective view of a preferred embodiment of the eyeglass frame portion of the invention.

Referring now to the drawing, there is illustrated in FIG. 1 a perspective view of a preferred embodiment of the eyeglass frame arrangement 11 of the invention. The frame 11 is preferably fabricated of a material which is generally rigid, strong, and non-elastic. In a preferred embodiment, the frame 11 is generally the shape of a normal eyeglass or sunglass frame. Persons of ordinary skill in the art will understand that the invention will find usefulness in connection with a wide variety of shapes and sizes of such frames, as well as a wide variety of activities.

In a preferred embodiment, the frame 11 is formed from a suitable lightweight metal, which can be electroplated to protect it from rust or other damage. Preferably, the frame 11 includes a lens support 24 fabricated with a channel or ridge 25 formed on the inside periphery and adapted to hold a lens 23. Persons of ordinary skill in the art will understand that any of a wide variety of styles of lenses and lens supports can be used with the invention. For example, in a preferred embodiment, the lens 23 portion of the frame 11 is fabricated of a strong material such as a polycarbonate. Further examples include the lens 23 portion either molded with the lens support 24 or adapted to fit into the pre-formed lens support 24. Persons of ordinary skill in the art will understand that the invention can be practiced with a single lens or multiple lenses and the lenses can be placed in front of or behind the frame 11.

The preferred frame 11 further includes a nose bridge 20 portion of the frame 11 mounted to the lens support 24 so that a lens 23 is in front of each eye of the user when the nose bridge 20 is mounted on the nose of the user. The nose bridge preferably is a substantially rigid, non-flexing component of the frame, and because it can be the focus of concentrated stress forces, it is preferably sufficiently thick (and can be thicker than adjacent portions of the frame 11) or otherwise reinforced to withstand those forces. For embodiments with frames that include materials other than metal, the nose bridge section of the frame preferably includes a resilient strong reinforcement material such as metal. Although the nose bridge is preferably rigid and non-flexing, in certain applications some flexing may be included so long as the overall desired general rigidness of the frame 11 is maintained and the flexing does not pinch the user's nose or otherwise render the frames unusable.

The preferred embodiment also includes an eye socket engager 12 mounted to and extending from the nose bridge 20 and/or lens supports 24. In a preferred embodiment, the eye socket engager 12 extends out towards the face of the wearer, engaging the eye sockets of the user such that when placed on the face of the user, the points of contact with the face are the nose bridge of the wearer, the nose of the wearer, and the inner (close to the nose) eye socket areas of the wearer. Preferably, one eye socket engager 12 is located on each side of the wearer's nose, slightly higher than the nose pads generally seen with eye glasses, closer to the height of the nose bridge 20 portion of the frame 11. In a preferred embodiment, the lens supports 24, nose bridge 20 and eye socket engager 12 are formed as a single piece.

The preferred lens support or supports 24 have a large enough space between the face and the frame to permit air, water, etc. to flow easily through and down, such that the water will not become trapped and air is allowed to circulate between the lenses and user.

In a preferred embodiment a pair of temple bows 13 are connected to the lens support or supports 24. The preferred temple bows are non-elastic (so as not to stretch or add "play" to the assembly when mounted on the wearer's head) but can have some flexibility. In other words, the temple bows preferably do not stretch along their lengthwise axes, but can be somewhat bendable to conform slightly to a wearer's head and perhaps be more comfortable. Preferably, the bows 13 include attachment means 19 (useful for attaching the frame to a retaining strap 14, as discussed below), shown as a vertical slit 18 in their rear ends, remote from the lenses. In the preferred embodiment, the attachment means 19 is a non-slipping engagement means for engaging temple bows on the eyeglasses. In other words, the preferred engagement between the strap and the temple bows on the eyeglasses is such that exerting tension on the strap does not cause the engagement position to slip downwards or backwards on the temple bows. Persons of ordinary skill in the art will understand that a wide variety of other attachment means and shapes and devices could be utilized without departing from the teachings of the invention.

Figure 2:
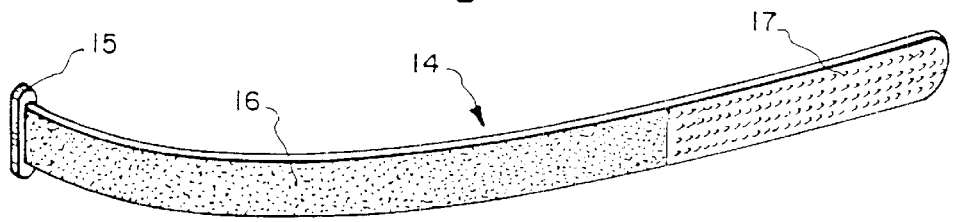
FIG. 2 is a perspective view of a preferred embodiment of the restraining strap portion of the present invention.

Turning now to FIG. 2, the preferred embodiment includes a retaining strap 14 made of hook-and-pile fastening material (of a type such as that marketed under the registered trademark VELCRO®), or other repeatably attachable and releasable connection. The preferred retaining strap 14 consists of a locking loop portion 15, connected to a pile portion 16 of hook-and-pile fastening material portion, connected to a hook portion 17 of hook-and-pile fastening material. Preferably, the pile 16 and hook 17 portion of the strap are of a size that will slide through the slit 18 without too much friction. The preferred locking loop portion 15 is made of a strong and non-elastic material, and is larger than the slit 18 so that it will not slide through the slit 18. Consequently, in the preferred embodiment, the end of the strap 14 opposite locking loop 15 can be inserted and pulled through one slit 18 until the loop 15 abuts the slit 18, thereby engaging the strap 14 and the frame 11.

As indicated elsewhere herein, persons of ordinary skill in the art will understand that a wide variety of other attachment means 19 can be employed to engage the strap 14 with the frame 11. By way of example and not by way of limitation, the strap can be integrally molded with the frame, can be snapped thereto, etc.

Figure 2A:
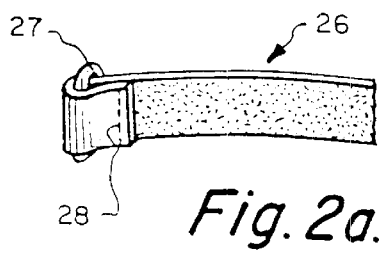
FIG. 2A is a perspective view of one of the many alternative embodiments of one end of the restraining strap portion of the present invention.

FIG. 2A illustrates one of the many alternative embodiments that can be used for one end of the retaining strap. Rather than a member such as loop 15 being glued or otherwise abutted to the end of the strap, a locking ring 27 is provided with a central opening, and retaining strap 26 is passed through locking ring 27 and is looped back upon itself, where it is secured by stitching 28 or the like. The strap 26 may then be inserted through an opening in the end of the temple bow, as described above, until the stitching 28 and locking ring 27 assembly abuts the temple bow.

Figure 3:
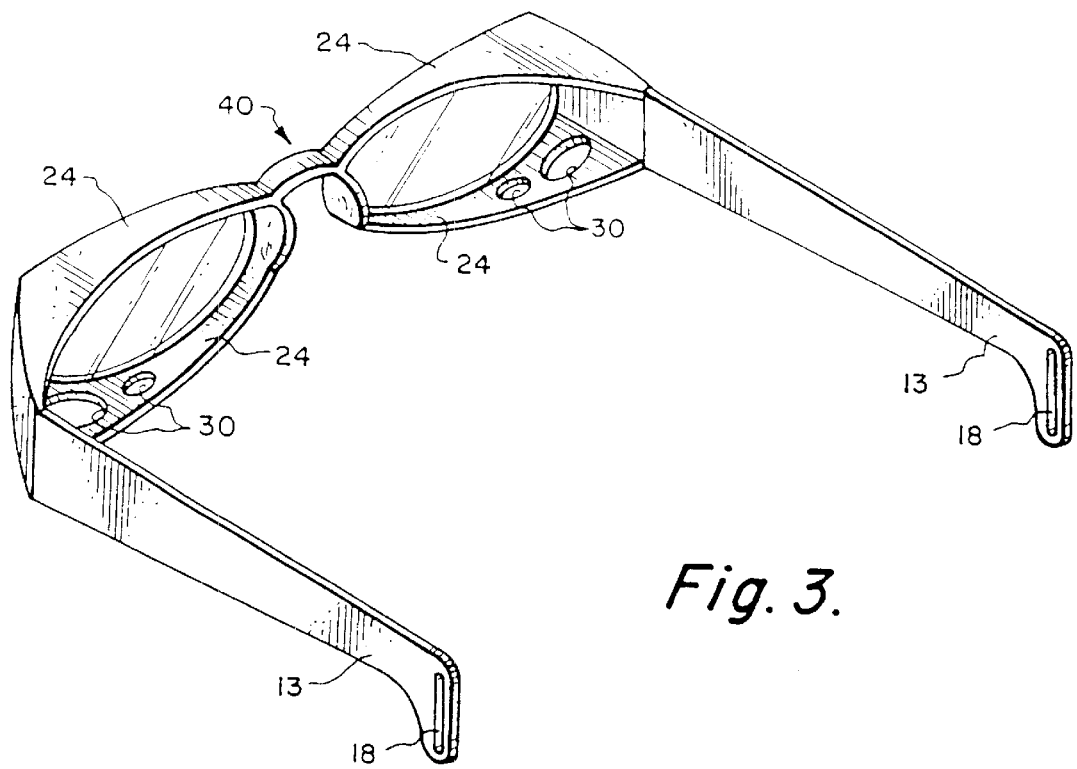
FIG. 3 is a perspective view of one of the many alternative embodiments of the eyeglass frame portion of the invention.

In one of the many alternative embodiments of invention, as illustrated in FIG. 3, the frame 40 includes lens supports 24 extend out and fit approximately flush against the user's face but have one or more ventilation holes 30 to allow air, water, etc. to flow easily through and down from between the lenses and the user's face, such that the water will not become trapped and air is allowed to circulate.

OPERATION OF INVENTION

In the preferred embodiment, the general shape and configuration of the frame means 11 permits a user to wear the frame means 11 conventionally, without any strap 14. After placing the frame arrangement 11 on the head, the user may simply not use the retaining strap 14 and wear the frame arrangement 11 fashionably, as might be desirable outside of a sporting activity. Persons of ordinary skill in the art will understand that this "strapless" approach does not have to be present to provide many of the other inventive benefits of the invention.

Figure 4:
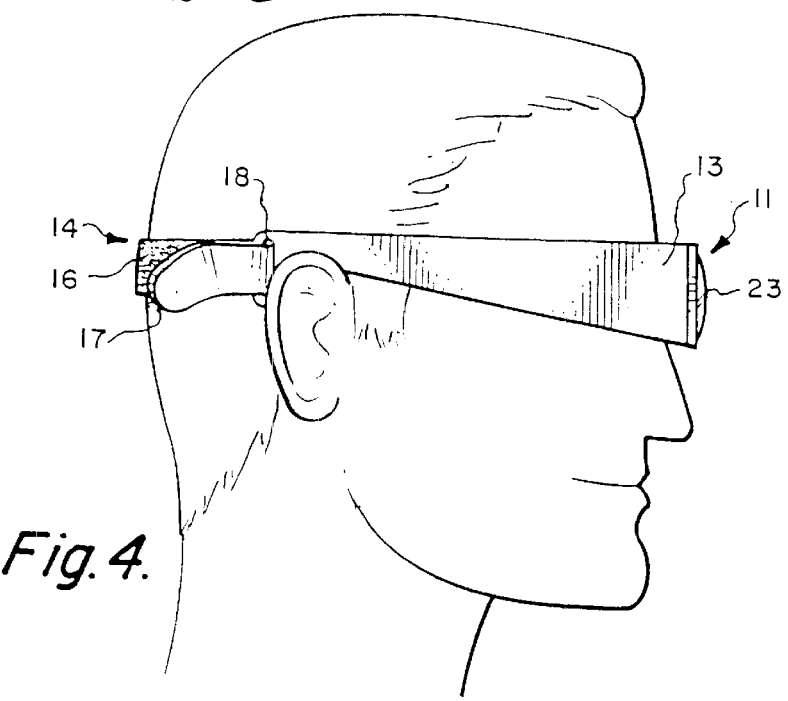
FIG. 4 is a side view of a preferred embodiment of the present invention as it may be assembled and worn.

The preferred embodiment permits the user to alternatively engage the arrangement as seen in FIG. 4, by pulling the retaining strap 14 through the slit 18 in the temple bow 13 until the locking loop portion 15 is locked against the slit 18 portion of the temple bow 13. The free hook portion 17 is then preferably pulled through the inside of the other slit 18 on the other temple bow 13 to the outside of the temple bow 13, and back around the user's head to mate the hook portion 17 to the pile portion 16.

With the preferred arrangement 11 and 14 so engaged, the user need not worry about the eyewear falling off. Specifically, the invention greatly reduces the possibility that an abrupt wave or other turbulence will knock off the user's glasses.

Among other things, the preferred rigidity of the frame 11, lack of elasticity in the frame 11 and retaining strap 14, and lack of cushioning materials prevent "play" (which increases the possibility of slippage) with the strap adjusted, so as to sufficiently restrict the assembly from inadvertent dislodgement from the wearer's head while not imposing uncomfortable pressure on the wearer's face or head.

On the face of the wearer, the preferred eye socket engager 12 portion of the frame 11 together with the nose bridge 20 portion keep the apparatus from sliding up or down the face as they engage the user's forehead, nose, nose bridge and eye sockets.

The temple bows 13 provide additional, lower restricting points, to secure the device on the side and backside of the head of the user by making use of the user's ears. The preferred temple bows 13 are sufficiently stiff and rigid to provide added stability and prevent the device from twisting and turning on the user's face, which (among other things) can be a danger to the user's eyes. Furthermore, the rigidity of the temple bows 13 also reduces the aforementioned "play".

Because the locking loop portion 15 is larger than the slit 18 and will not slide through the slit 18, it serves to "lock" the retaining strap 14 into place after the strap is tightened.

The non-elasticity of the restraining strap 14 serves to reduce the uncomfortable pressure that can come with elasticity. By adjusting the strap 14 to a preferred position without slack, the user also serves to limit play of the assembly on his or her head. When properly adjusted, the strap 14 is kept from sliding up over the back of the wearer's head by the normally protruding upper backside of the wearer's head. The strap 14 is kept from sliding down the back of the wearer's head by the contact made between the temple bow portion 13 and ear of the wearer. The hook 17 and pile 16 fastening material allows the arrangement to fit all sizes of heads and makes adjustment easy. Because the preferred strap is easily detachable, the wearer is able to use the device as regular sunglasses or seeing glasses when the secure fit or retention of the glasses on the wearer's head is not necessary.

The preferred non-sealing fit of the frame arrangement 11 against the wearer's face allows for any water to drain immediately out of the frame and down the wearer's face in order to avoid the trapping of water. This feature also allows for plenty of air flow which avoids or reduces fogging. The preferred strong materials used such as polycarbonate lenses allow the wearer a high level of protection and a lasting device. As with other aspects of the invention, however, persons of ordinary skill in the art will understand that certain embodiments of the invention can include frames having a close or even sealing fit against the user's face, and can be fabricated with lenses of material other than polycarbonate.

A preferred method of retaining eyeglasses on a wearer is also enabled by the apparatus of the invention. In embodiments utilizing the preferred holes 18 in the end of the temple bows and the unitary (as opposed to multi-piece) retaining strap, the user can readily engage and adjust the assembly on his or her head. Persons of ordinary skill in the art will appreciate that this is accomplished in the preferred embodiment by providing the preferred adjustability of strap length adjacent one end of the strap. In the preferred method, the strap can be assembled through both temple bow holes 18 but in a slightly longer dimension than the final "restrictive" length desired to retain the assembly on the wearer's head. That slightly longer dimension enables the wearer to place the assembly over and onto his or her head (sliding the strap over the protruding rear portion of the wearer's skull). Once the assembly has been placed on the wearer's head, the wearer can easily secure the assembly on his or her head by disengaging the strap (but not removing it from the hole 18), adjusting the strap to the desired length, and re-engaging or fixing the strap at that desired length. For alternative embodiments (such as those using buckle securement or the like to adjust the strap length), the step of securement of the assembly to the wearer's head involves adjusting the buckle or other engagement.

The above and other objects of the present invention are achieved, according to a preferred embodiment hereof, by breaking away from the conventional art and using exactly the opposite to create this improved system. The theory that I have used here is the same theory that works for a watch that comfortably stays on a wearer's wrist while swimming. It is not the pressure created by a tight wrist band, but rather the restricting points of the wearer's arm that keep the wrist band from sliding up or down the wearer's arm. The key then was to find restrictive points that would prevent sliding and to utilize those points with rigid materials. Rather than using pressure to keep the eyeglasses on the head of the wearer, I have utilized restrictive points on a normal wearer's head—the nose, nose bridge, eyesockets, and forehead on the front end, and the ears and the protruding upper skull on the back end.

Thus, the preferred adjustable eyewear retainer and assembly of my invention provides a secure, comfortable, easily adjustable, fog-resistant, protective, sturdy device that prevents water from getting trapped between the lenses and the wearer's face.

As indicated above, many other variations are possible. Further examples of such modifications include that the eye socket engager portion 12 and the nose bridge portion of the frame may be altered to better fit to the features of the wearer's face. Also, the eye socket engager portion may be altered so that it is adjustable.

Additionally, and as indicated above, other fasteners could be used instead of the hook-and-pile fasteners. For example, an alligator spring grip buckle described in Thomas W. Pomatti's U.S. Pat. No. 5,488,441 issued Jan. 30, 1996 would be satisfactory.

The apparatus and methods of my invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

I claim:

1. An elongated unitary retaining strap for holding eyeglasses on a wearer's head including a locking loop at one end of said strap for engaging said strap with a temple bow of an eyeglasses frame, and in which said strap is configured to permit all of said strap except said locking loop to pass through an opening in the temple bow such that said locking loop prevents said strap from passing completely through the opening, and in which said strap is fabricated to be generally non-elastic, in which said strap includes hook-and-pile fastening material to permit ready adjustment and sizing of said strap to the wearer's head.

2. The strap of claim 1, including non-slipping engagement means for engaging temple bows on the eyeglasses.

3. The strap of claim 1 or claim 2, in which an opposite end of said strap is configured to pass through an opening in a second temple bow of an eyeglasses frame and to then be folded back upon itself to engage said hook-and-pile fastening material.

4. The strap of claim 1, including attachment means for attaching said retaining strap to the eyeglasses.

5. An eye-glass frame arrangement for holding a lens in front of each eye of the user comprising, in combination:
   one or more lens supports fabricated of a generally rigid, substantially non-deformable, non-elastic material, said one or more lens supports being adapted to hold said lens or lenses;
   a generally rigid, substantially non-deformable nose bridge mounted to said lens support so that said lens is in front of each eye of the user under the condition of the nose bridge being mounted on the nose of the user;
   a plurality of temple bows fabricated of a non-elastic material, mounted on said lens support in a position engageable with the user ears;
   a non-elastic retaining strap arrangement mountable securely to the ends of the temple bows whereby the user may tighten said restraining strap to restrict movement of the arrangement by an interference fit between the nose and forehead on the front of the wearer's head and between the ears and protruding rear and side of the skull on the side and back of the wearer's head;
   said lens supports have one or more holes to provide ventilation and drainage between said frame and the wear's face.

6. An eye-glass frame arrangement for holding a lens in front of each eye of the user comprising, in combination:
   one or more lens supports fabricated of a generally rigid, substantially non-deformable, non-elastic material, said one or more lens supports being adapted to hold said lens or lenses;
   a generally rigid, substantially non-deformable nose bridge mounted to said lens support so that said lens is in front of each eye of the user under the condition of the nose bridge being mounted on the nose of the user;
   a plurality of temple bows fabricated of a non-elastic material, mounted on said lens support in a position engageable with the user ears;
   a non-elastic retaining strap arrangement mountable securely to the ends of the temple bows whereby the user may tighten said restraining strap to restrict movement of the arrangement by an interference fit between the nose and forehead on the front of the wearer's head and between the ears and protruding rear and side of the skull on the side and back of the wearer's head;
   an eye socket engager mounted to said frame and extending inwards towards the wearer's face to engage the wearer's eye socket and thereby further restricting movement of said frame with respect to the wearer's face.

7. The eyeglass frame arrangement in claim 6 wherein: said eye socket engager portion is generally vertically positioned so that it is close to the height of said nose bridge.

8. An eye-glass frame arrangement for holding a lens in front of each eye of the user comprising, in combination:
   one or more lens supports fabricated of a generally rigid, substantially non-deformable, non-elastic material, said one or more lens supports being adapted to hold said lens or lenses;
   a generally rigid, substantially non-deformable nose bridge mounted to said lens support so that said lens is in front of each eye of the user under the condition of the nose bridge being mounted on the nose of the user;
   a plurality of temple bows fabricated of a non-elastic material, mounted on said lens support in a position engageable with the user ears;

a non-elastic retaining strap arrangement mountable securely to the ends of the temple bows whereby the user may tighten said restraining strap to restrict movement of the arrangement by an interference fit between the nose and forehead on the front of the wearer's head and between the ears and protruding rear and side of the skull on the side and back of the wearer's head, said retaining strap is made of hook-and-pile fastening material whereby the arrangement is readily adjustable to fit a range of head sizes.

9. An eyeglasses frame assembly, including a generally rigid, substantially non-deformable frame member for positioning one or more lenses in front of a wearer's eyes, said frame member attached to two ear pieces having rearwards ends positionable adjacent the wearer's ears, and a non-elastic retaining strap member attached to and extending between said rearward ends, in which said strap member permits ready adjustment and sizing of said assembly to the wearer's head;

said frame assembly is configured to engage the wearer's eye sockets and ears, and said strap member is configured to engage the normal rearward skull protrusion on the wearer's head to resist inadvertent dislodgement of said assembly from the wearer's head.

10. An adjustable eyeglasses apparatus to restrictively retain eyeglasses on a user's head, including a frame fabricated of a generally rigid, non-deformable, non-elastic material, said frame designed to hold a lens in front of each eye of the user with a nose bridge mounted upon the nose of the user; a plurality of temple bows fabricated of non-elastic material, said temple bows include remote portions that pass above the location on the user's head where his ears connect to his head; and a non-elastic retaining strap arrangement securely mounted to said remote portions of said temple bows, said strap being adjustable to achieve said restrictive retention of said frame on the user's head, whereby the frame and strap arrangement is restricted between the nose and forehead and/or eye socket of the user at the front of the user's head and constrained by the ears and contour of the occipital area of the skull when the retaining strap is properly adjusted and securely fastened; adjustability of said strap is provided by hook-and-pile fastening material on said strap.

11. An eye-glass frame arrangement for holding a lens in front of each eye of the user comprising, in combination:

one or more lens supports fabricated of a generally rigid, substantially non-deformable, non-elastic material, said one or more lens supports being adapted to hold said lens or lenses;

a generally rigid, substantially non-deformable nose bridge mounted to said lens support so that said lens is in front of each eye of the user under the condition of the nose bridge being mounted on the nose of the user;

a plurality of temple bows fabricated of a non-elastic material, mounted on said lens support in a position engageable with the user ears;

a non-elastic retaining strap arrangement mountable securely to the ends of the temple bows whereby the user may tighten said restraining strap to restrict movement of the arrangement by an interference fit between the nose and forehead on the front of the wearer's head and between the ears and protruding rear and side of the skull on the side and back of the wearer's head;

at least one engagement element formed on said frame arrangement, said engagement element generally disposed in front of the wearer's eyes sufficiently to form an interference fit with the wearer's eye socket on the wearer's skull when said frame arrangement is assembled on the wearer's head.

12. The eyeglass frame arrangement of claim 11, in which said secure mounting of said strap to said ends of said temple bows comprises a substantially non-deformable connection structure.

13. An eye-glass frame arrangement for holding a lens in front of each eye of the user comprising, in combination:

one or more lens supports fabricated of a generally rigid, non-elastic material, said one or more lens supports being adapted to hold said lens or lenses;

a nose bridge mounted to said lens support so that said lens is in front of each eye of the user under the condition of the nose bridge being mounted on the nose of the user;

a plurality of temple bows fabricated of a non-elastic material, mounted on said lens support in a position engageable with the user ears;

a non-elastic retaining strap arrangement mountable securely to the ends of the temple bows whereby the user may tighten said restraining strap to restrict movement of the arrangement by an interference fit between the nose and forehead on the front of the wearer's head and between the ears and protruding rear and side of the skull on the side and back of the wearer's head;

an eye socket engager mounted to said frame and extending inwards towards the wearer's face to engage the wearer's eye socket and thereby further restricting movement of said frame with respect to the wearer's face.

14. An eyeglasses frame assembly, including a generally rigid frame member for positioning one or more lenses in front of a wearer's eyes, said frame member attached to two ear pieces having rearwards ends positionable adjacent the wearer's ears, and a non-elastic retaining strap member attached to and extending between said rearward ends, in which said strap member permits ready adjustment and sizing of said assembly to the wearer's head;

said frame assembly is configured to engage the wearer's eye sockets and ears, and said strap member is configured to engage the normal rearward skull protrusion on the wearer's head to resist in advertent dislodgement of said assembly from the wearer's head.

15. An eye-glass frame arrangement for holding a lens in front of each eye of the user comprising, in combination:

one or more lens supports fabricated of a generally rigid, non-elastic material, said one or more lens supports being adapted to hold said lens or lenses;

a nose bridge mounted to said lens support so that said lens is in front of each eye of the user under the condition of the nose bridge being mounted on the nose of the user;

a plurality of temple bows fabricated of a non-elastic material, mounted on said lens support in a position engageable with the user ears;

a non-elastic retaining strap arrangement mountable securely to the ends of the temple bows whereby the user may tighten said restraining strap to restrict movement of the arrangement by an interference fit between the nose and forehead on the front of the wearer's head and between the ears and protruding rear and side of the skull on the side and back of the wearer's head;

at least one engagement element formed on said frame, said engagement element generally disposed in front of the wearer's sufficiently to form an interference fit with the wearer's eye socket on the wearer's skull when said frame arrangement is assembled on the wearer's head.

16. The eye-glass frame arrangement, assembly and apparatus of any one of claims 5–15 where said frame arrangement, assembly and apparatus does not create a seal around the eyes.

* * * * *